United States Patent [19]

Okabe et al.

[11] Patent Number: 5,697,122

[45] Date of Patent: Dec. 16, 1997

[54] ROTARY DAMPER AND CLOSURE DEVICE WITH SUCH ROTARY DAMPER

[75] Inventors: Harunori Okabe; Kenji Takahashi, both of Tokyo, Japan

[73] Assignee: Tok Bearing Co., Ltd., Tokyo, Japan

[21] Appl. No.: 517,168

[22] Filed: Aug. 21, 1995

[30] Foreign Application Priority Data

Aug. 19, 1994 [JP] Japan .................. 6-218056
Feb. 7, 1995 [JP] Japan .................. 7-042531

[51] Int. Cl.$^6$ .......................................... C05F 5/02
[52] U.S. Cl. .......................... 16/82; 16/85; 188/293; 188/296; 188/307
[58] Field of Search .................. 188/290, 293, 188/296, 307; 16/193, 82, 84

[56] References Cited

U.S. PATENT DOCUMENTS

| | | | |
|---|---|---|---|
| 736,714 | 8/1903 | Gendron | 16/1 R |
| 1,500,138 | 7/1924 | Le Maire | |
| 1,643,016 | 9/1927 | Huff | |
| 1,778,905 | 10/1930 | Mitchell | |
| 1,799,662 | 4/1931 | Weiss | |
| 1,906,643 | 5/1933 | Simon | |
| 1,942,658 | 1/1934 | Mitchell | 188/89 |
| 1,966,005 | 7/1934 | Fieldman | 188/89 |
| 1,991,201 | 2/1935 | Fieldman | 188/89 |
| 2,004,910 | 6/1935 | Fieldman | 188/89 |
| 2,038,587 | 4/1936 | Mitchell | 188/89 |
| 2,038,588 | 4/1936 | Mitchell | 188/89 |
| 2,202,303 | 5/1940 | Swanson | 16/82 |
| 2,790,520 | 4/1957 | Kuhn | 188/93 |
| 4,609,081 | 9/1986 | Hungerford | 188/307 |
| 4,828,236 | 5/1989 | Inoue | 188/290 |
| 5,133,433 | 7/1992 | Oosawa | 188/290 |
| 5,152,189 | 10/1992 | Miura et al. | |
| 5,353,899 | 10/1994 | Ohshima | 188/290 |
| 5,392,884 | 2/1995 | Ojima | 188/293 |

FOREIGN PATENT DOCUMENTS

| | | |
|---|---|---|
| 0 529 313 A | 3/1993 | European Pat. Off. |
| 0 576 672 A | 1/1994 | European Pat. Off. |

*Primary Examiner*—Daniel W. Howell
*Assistant Examiner*—Christopher Kirkman
*Attorney, Agent, or Firm*—Merchant, Gould, Smith, Edell, Welter & Schmidt

[57] ABSTRACT

A rotary damper has a movable valve supported on a support projection radially outwardly projecting from a shaft of a rotating member which is rotatably disposed in a chamber filled with a viscous fluid in a casing. Depending on the direction in which the rotating member rotates in the chamber, the movable valve opens or closes a fluid path defined between the movable valve and an inner circumferential surface of the casing. The movable valve may be angularly movably supported on the support projection which is of a circular cross-sectional shape or radially movably supported on the support projection which is of a rectangular cross-sectional shape.

24 Claims, 10 Drawing Sheets

ROTARY DAMPER AND CLOSURE DEVICE WITH SUCH ROTARY DAMPER

BACKGROUND OF THE INVENTION

1. Field of the Invention

The present invention relates to a rotary damper for use as a high-torque damper for producing high torque damping forces, and more particularly to a non-hysteresis rotary damper which is free from any operational ranges where no damping action is available, and a closure device which employs such a non-hysteresis rotary damper.

2. Description of the Prior Art

One known high-torque rotary damper is disclosed in Japanese laid-open patent publication No. 4-282039 which corresponds to U.S. Pat. No. 5,152,189.

Figure 12:
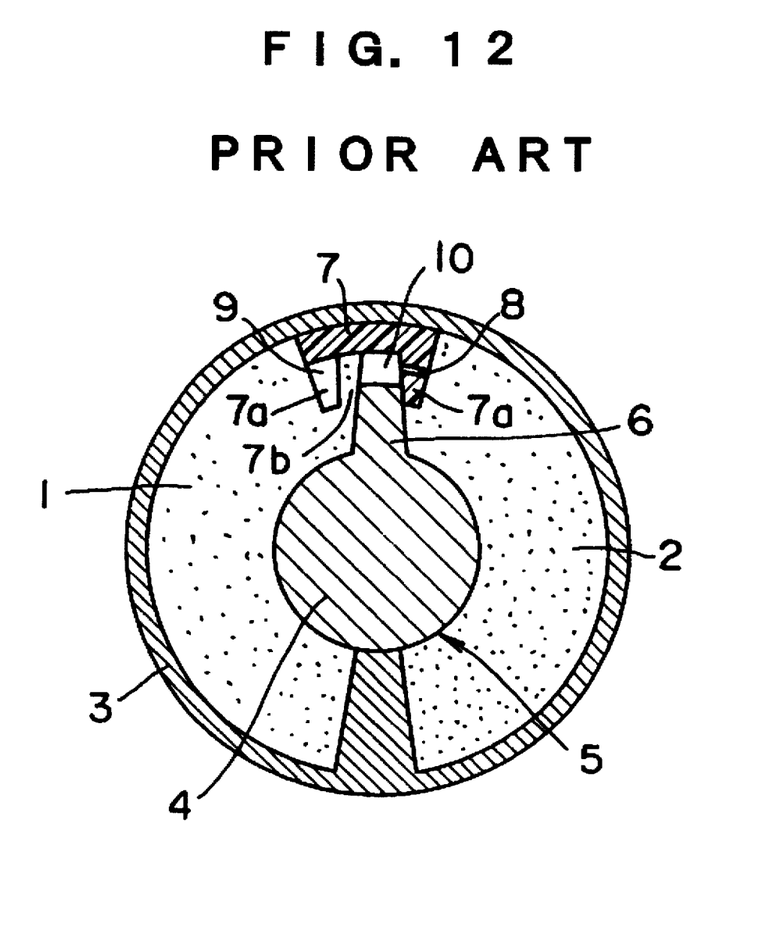
FIG. 12 is a cross-sectional view of a conventional rotary damper.

The disclosed rotary damper will be described below with reference to FIG. 12 of the accompanying drawings. As shown in FIG. 12, the high-torque rotary damper comprises a casing 3 having a hollow cylindrical chamber 1 filled with a viscous fluid 2, a rotating member 5 relatively rotatably disposed in the casing 3 and having a shaft member 4 at its center which is rotatable in the hollow cylindrical chamber 1, and a movable valve 7 engageable with an axial projection or vane 6 on the shaft member 4 through a lost-motion connection in the direction in which the shaft member 4 is rotatable, the movable valve 7 being rotatable with the rotating member 5 while sliding on a wall surface of the casing 3. A plurality of viscous fluid channels 8, 9, 10 having different cross-sectional areas, respectively, are defined in walls 7a of the movable valve 7 and the axial vane 6 which can contact each other for imposing different resistances to viscous fluid flows depending on the direction in which the casing 3 and the rotating member 5 rotate relative to each other. The viscous fluid channel 8 has a small cross-sectional area, and the viscous fluid channel 9 has a cross-sectional area larger than the cross-sectional area of the viscous fluid channel 8.

When the casing 3 and the rotating member 5 rotate relative to each other, the movable valve 7 also rotates in the viscous fluid 2 and changes its position with respect to the rotating member 5. The movable valve 7 engages the axial vane 6 through the lost-motion connection in the direction in which the shaft member 4 rotates. The viscous fluid channels 8, 9, 10 defined in the walls 7a of the movable valve 7 and the axial vane 6 impose different resistances to viscous fluid flows from one side to the other of the axial vane 6 and the movable valve 7 depending on the direction in which the casing 3 and the rotating member 5 rotate relative to each other.

Specifically, when the rotating member 5 rotates with respect to the casing 3 in one direction, i.e., in a direction to displace the axial vane 6 toward the viscous fluid channel 9, almost no resistance is applied to a fluid flow across the axial vane 6 and the movable valve 7 as the fluid flows through the viscous fluid channels 9, 10. However, when the rotating member 5 rotates with respect to the casing 3 in the opposite direction, i.e., in a direction to displace the axial vane 6 toward the viscous fluid channel 8, a high resistance is applied to a fluid flow across the axial vane 6 and the movable valve 7 because the fluid flows through the viscous fluid channels 8, 10. Therefore, when the rotating member 5 rotates with respect to the casing 3 in the opposite direction, the high resistance imposed on the fluid flow produces very high torque damping forces.

The torque damping forces are greater as the cross-sectional area of the viscous fluid channel 8 is smaller. As a consequence, the conventional rotary damper can produce different torque damping forces depending on the cross-sectional area of the viscous fluid channel 8.

The lost-motion connection is provided by a gap 7b between the axial vane 6 and the walls 7a of the movable valve 7. When the rotating member 5 rotates with respect to the casing 3 in a direction to displace the axial vane 6 toward the viscous fluid channel 8, because the axial vane 6 has to move across the gap 7b until it reaches the viscous fluid channel 8, the rotary damper cannot immediately produce high torque damping forces and hence has a certain initial operational range in which no damping action is available.

If the prior rotary damper is used with the fall board of a piano to dampen the closing movement of the fall board, then the user may possibly get fingers pinched by the fall board when the user opens the fall board to some extent and then releases the fall board because no damping action is performed by the rotary damper in its initial operational range.

SUMMARY OF THE INVENTION

It is therefore an object of the present invention to provide a non-hysteresis rotary damper which is free from any operational ranges where no damping action is available.

Another object of the present invention is to provide a closure device, such as the fall board of a piano, which employs such a non-hysteresis rotary damper.

According to the present invention, there is provided a rotary damper comprising a casing having a chamber defined therein which is filled with a viscous fluid, a rotating member rotatably disposed in the casing and having a shaft, and valve means movably supported on the rotating member for controlling a flow of the viscous fluid in the chamber, the rotating member having a support projection projecting radially outwardly from an outer circumferential surface of the shaft and extending parallel to an axis of the shaft, the valve means being movably supported on the support projection to define a fluid path for the viscous fluid between the valve and an inner circumferential surface of the casing, the valve means being movable on the support projection to selectively open and close the fluid path depending on the direction in which the rotating member rotates in the chamber.

When the rotating member rotates in one direction in the chamber, the resistance of the viscous fluid is applied to the valve means, moving the valve means on the support projection in a direction to close the fluid path. The rotary damper now develops high torque damping forces.

When the rotating member rotates in the opposite direction in the chamber, the valve means moves on the support projection in a direction to open the fluid path under the resistance of the viscous fluid. The viscous fluid is now allowed to flow smoothly across the valve means through the fluid path. At this time, the rotary damper generates no torque damping forces.

According to the present invention, there is also provided a closure device for selectively opening and closing a cover, comprising an arm having a roller rotatably mounted on an end thereof and held in rolling contact with the cover, a rotary damper having a shaft coupled to the arm for being angularly moved by the arm, and a support base integral with the rotary damper and extending in at least one direction from the rotary damper, the support base being adapted to be fixed to a member with respect to which the cover is to be closed, the rotary damper comprising a casing having a chamber defined therein which is filled with a viscous fluid, a rotating member rotatably disposed in the casing and having a shaft, and valve means angularly supported on the rotating member for controlling a flow of the viscous fluid in the chamber, the rotating member having a support projection projecting radially outwardly from an outer circumferential surface of the shaft and extending parallel to an axis of the shaft, the valve means being movably supported on the support projection to define a fluid path for the viscous fluid between the valve and an inner circumferential surface of the casing, the valve means being movable on the support projection to selectively open and close the fluid path depending on the direction in which the rotating member rotates in the chamber.

According to the present invention, there is also provided a rotary damper comprising a casing having a chamber defined therein which is filled with a viscous fluid, a rotating member rotatably disposed in the chamber, and a valve movably supported on the rotating member for radial movement into and out of contact with an inner circumferential surface of the casing to selectively open and close a fluid path defined between the valve and an inner circumferential surface of the casing depending on the direction in which the rotating member rotates in the chamber.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Like or corresponding reference characters denote like or corresponding parts throughout views.

Figure 1:
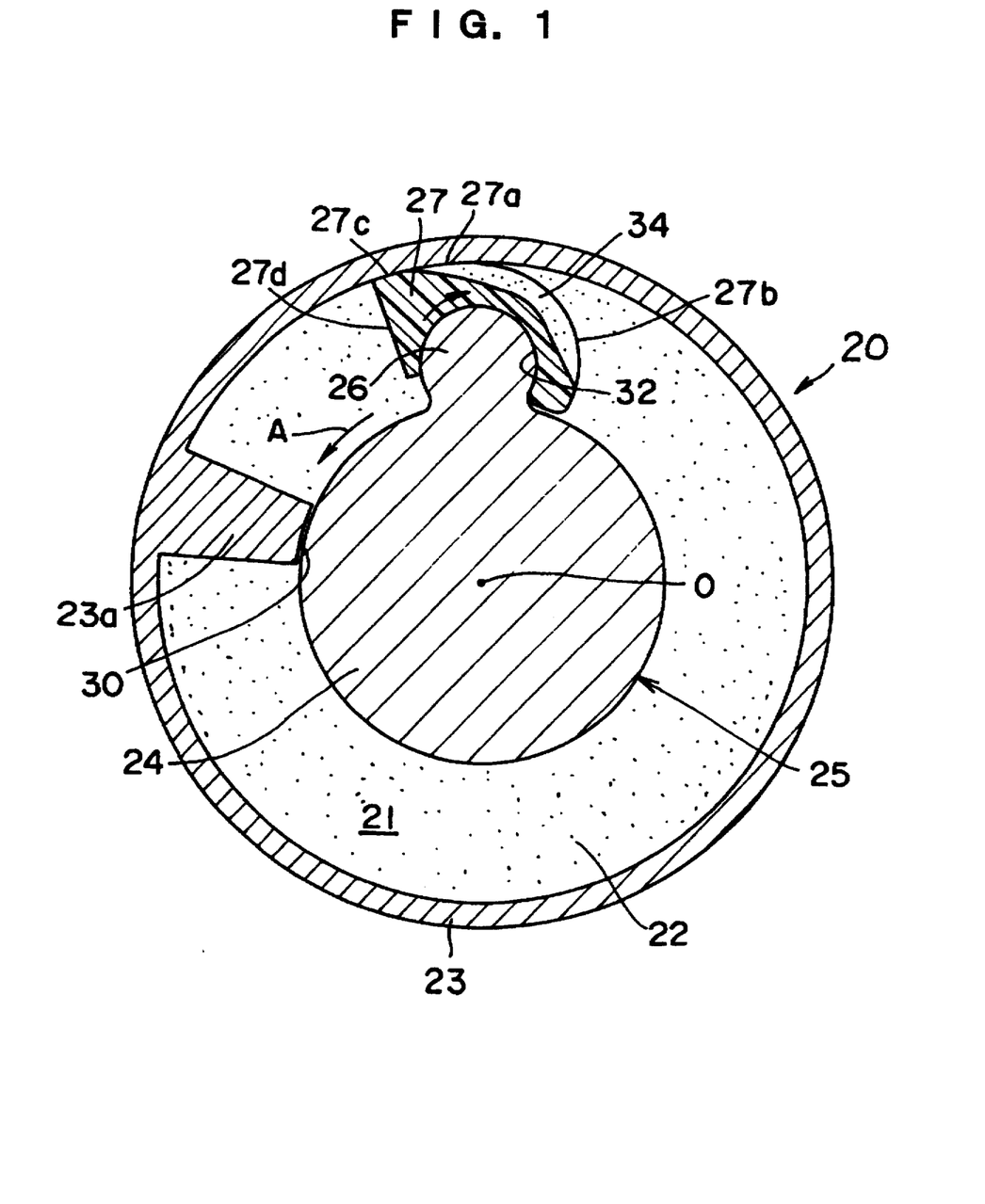
FIG. 1 is a cross-sectional view of a rotary damper according to an embodiment of the present invention.
Figure 2:
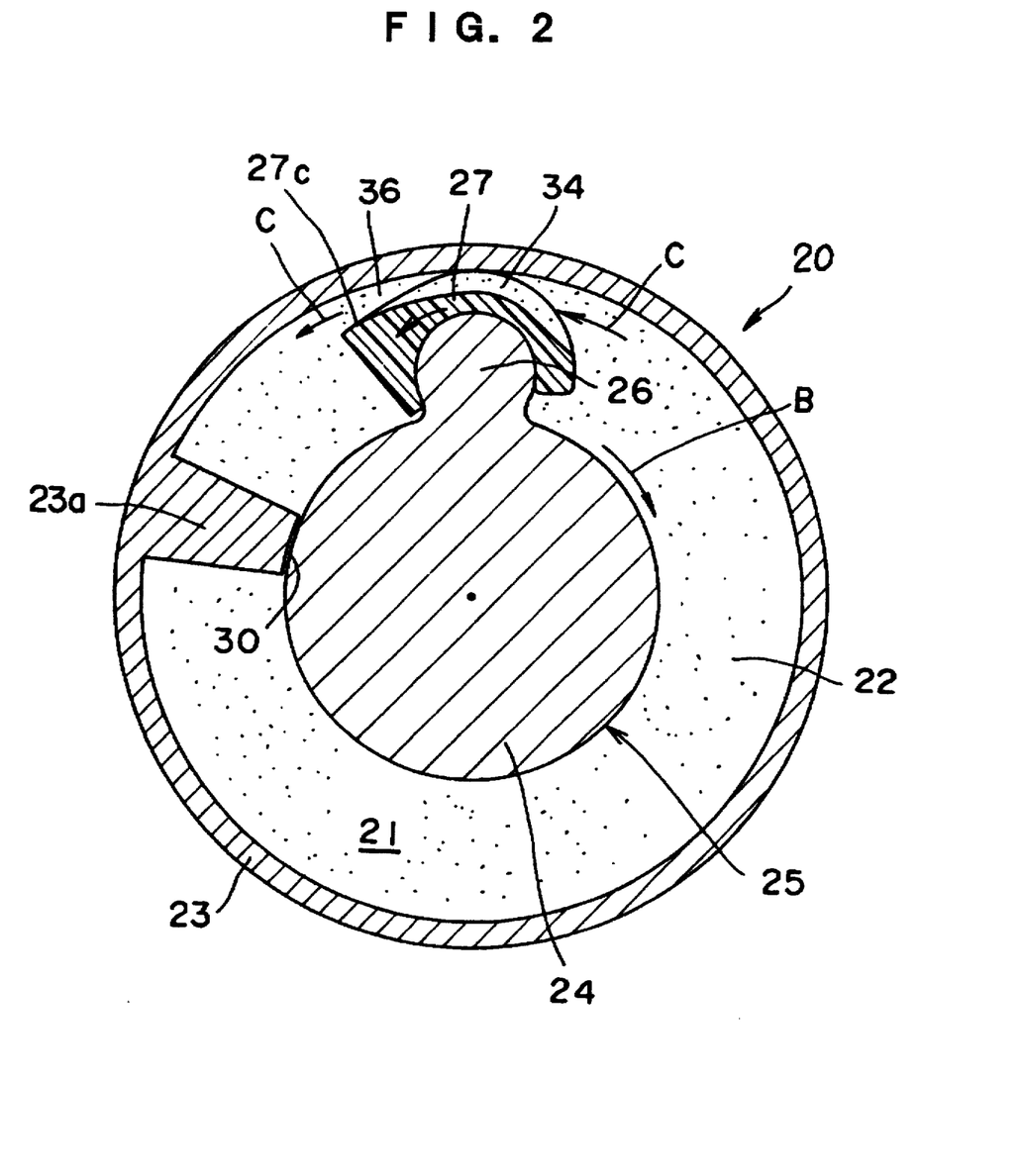
FIG. 2 is a cross-sectional view of the rotary damper shown in FIG. 1, illustrating the manner in which a movable valve thereof moves.
Figure 3:
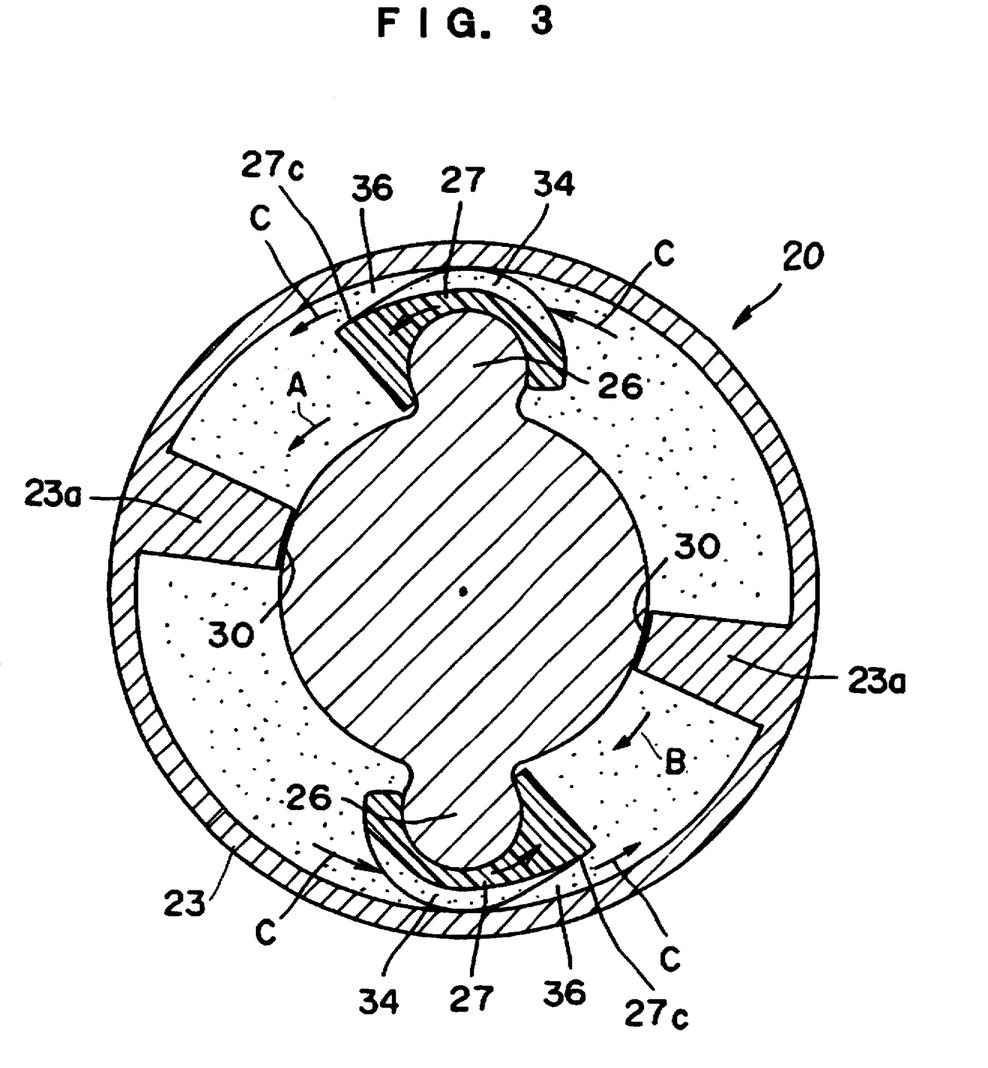
FIG. 3 is a cross-sectional view of a rotary damper according to another embodiment of the present invention.

FIGS. 1 through 3 show a rotary damper according to an embodiment of the present invention.

As shown in FIG. 1, the rotary damper, generally designated by the reference numeral 20, comprises an axially elongate casing 23 having a hollow cylindrical chamber 21 defined therein which is filled with a highly viscous fluid 22 such as grease. The casing 23 has an integral casing ridge 23a extending axially longitudinally and projecting radially inwardly toward a central axis O thereof. As described later on, the casing ridge 23a serves as a stopper for limiting rotation of a rotating member 25 disposed in the casing 23.

The rotating member 25 is positioned in the casing 23 for rotation with respect to the casing 23. The rotating member 25, which serves as an input shaft, includes a shaft 24 coaxial with the casing 23 and having opposite ends rotatably tatably supported on end walls of the casing 23 by respective bearings (not shown).

The casing ridge 23a has a radially inner end spaced slightly from the outer circumferential surface of the shaft 24 by a small clearance 30 such that the shaft 24 can rotate without interference with the casing ridge 23a.

The rotating member 25 has a support projection 26 on which a movable valve 27 (described below) is rotatably supported. The support projection 26 projects radially outwardly from the outer circumferential surface of the shaft 24 and extends axially longitudinally parallel to the axis O of the shaft 24. The support projection 26 has a substantially circular cross-sectional shape.

In the embodiment shown in FIGS. 1 and 2, the rotating member 25 has only one support projection 26. However, as shown in FIG. 3, the rotating member 25 may have a pair of diametrically opposite support projections 26 spaced 180° from each other on the outer circumferential surface of the shaft 24, a pair of movable valves 27 may be angularly movably mounted on the support projections 26, respectively, and the casing 23 may have a pair of diametrically opposite support projections 26 disposed between the casing ridges 23a.

Figure 4:
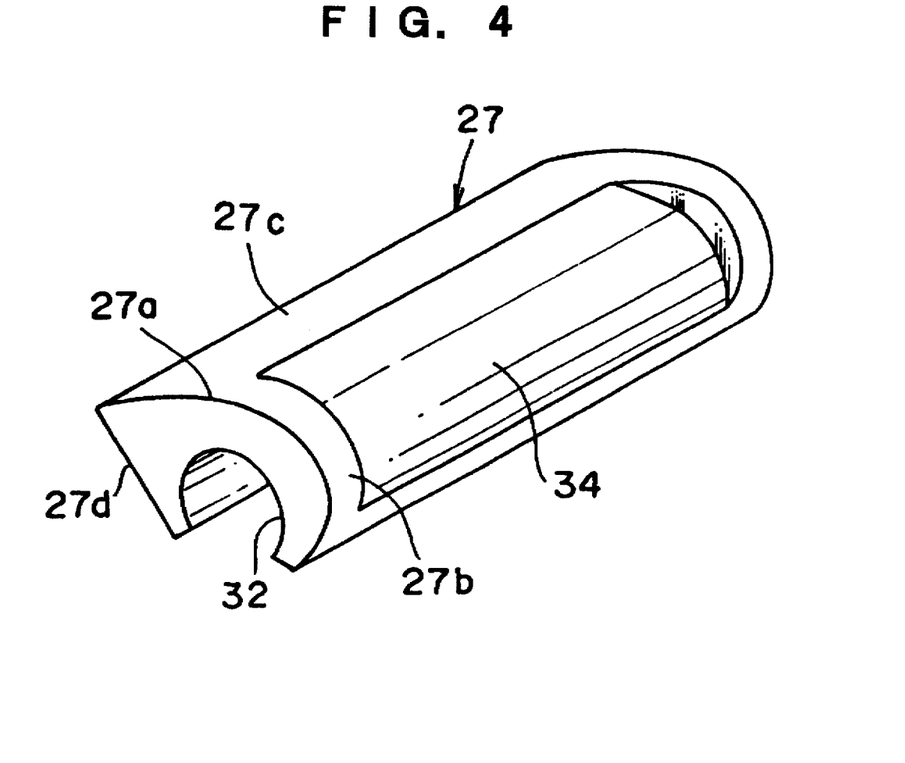
FIG. 4 is a perspective view of the movable valve shown in FIGS. 1 and 2.

The movable valve 27 is shown in detail in FIG. 4. The movable valve 27 has a recess 32 defined therein which is substantially complementary in shape to the support projection 26, i.e., which has a dieter substantially equal to the outside diameter of the support projection 26. The recess 32 opens radially inwardly and extends in the longitudinal direction of the support projection 26. The support projection 26 is relatively rotatably fitted in the recess 32 in the movable valve 27 such that the movable valve 27 can move angularly on the support projection 26 about the axis of the support projection 26.

The movable valve 27 has a large-diameter outer curved surface 27a and a small-diameter outer curved surface 27b which face radially outwardly. The large-diameter outer curved surface 27a has a radius of curvature which is the same as the radius of curvature of the inner circumferential surface of the casing 23, and the small-diameter outer curved surface 27b has a radius of curvature which is smaller than the radius of curvature of the large-diameter outer curved surface 27a. The movable valve 27 also has a fluid passage 34 defined as a recess in both the large-diameter outer curved surface 27a and the small-diameter outer curved surface 27b. The fluid passage 34 extends continuously axially between the opposite axial ends of the movable valve 27. The large-diameter outer curved surface 27a includes a fluid blocking surface 27c near its end which can contact the inner circumferential surface of the casing 23 for blocking a flow of the viscous fluid 22 past the movable valve 27 along the inner circumferential surface of the casing 23. The movable valve 27 further has a flat surface 27d extending on one side thereof radially in alignment with the axis O of the shaft 24. The flat surface 27d serves to bear the resistance from the viscous fluid 22 when the shaft 24 rotates in one direction about the axis O.

Figure 5:
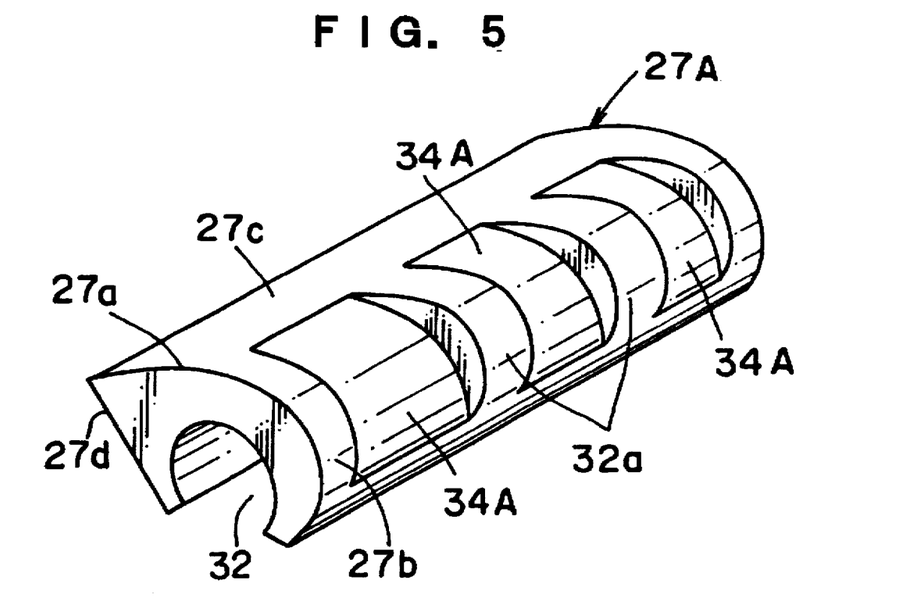
FIG. 5 is a perspective view of a movable valve according to still another embodiment of the present invention.

FIG. 5 shows a movable valve 27A according to still another embodiment of the present invention. The movable valve 27A differs from the movable valve 27 shown in FIG. 3 in that it has a plurality of parallel fluid passages 34A (FIG. 5) defined in both the large-diameter outer curved surface 27a and the small-diameter outer curved surface 27b and spaced axially by a plurality of ribs 32a positioned therebetween.

Operation of the rotary damper 20 shown in FIGS. 1 through 3 will be described below.

When the shaft 24 of the rotating member 25 rotates counterclockwise in the direction indicated by the arrow A in FIG. 1, the viscous fluid 22 in the hollow cylindrical chamber 21 applies a resistance to the flat surface 27d of the movable valve 27, angularly moving the movable valve 27 clockwise in the direction indicated by the arrow, which is opposite to the direction indicated by the arrow A, around the support projection 26. The fluid blocking surface 27c of the movable valve 27 is brought into intimate contact with the inner circumferential surface of the casing 23. upon further rotation of the rotating member 25 in the direction indicated by the arrow A, the viscous fluid 22 is pushed by the flat surface 27d and forced to flow through the clearance 30 between the casing ridge 22 and the shaft 24. Since the clearance 30 functions as an orifice to restrict the flow of the viscous fluid 22 therethrough, the viscous fluid 22 produces high torque damping forces against the rotation of the rotating member 25 in the casing 23. The movable valve 27 automatically moves angularly around the support projection 26 and hence the rotary damper 20 generates its damping action immediately after the rotating member 25 has started to rotate in the direction indicated by the arrow A. Consequently, when the rotating member 25 rotates in the direction indicated by the arrow A, the rotary damper 20 is free of any substantial operational range where no damping action is available, and hence functions as a non-hysteresis rotary damper. The rotation of the rotary member 25 stops when the movable valve 27 engages the casing ridge 23a.

When the shaft 24 of the rotating member 25 rotates clockwise in the direction indicated by the arrow B in FIG. 2, the movable valve 27 is angularly moved counterclockwise in the direction indicated by the arrow, which is opposite to the direction indicated by the arrow B, around the support projection 26 under the resistance of the viscous fluid 22 in the hollow cylindrical chamber 21. The fluid blocking surface 27c of the movable valve 27 is displaced out of intimate contact with the inner circumferential surface of the casing 23. The fluid passage 34 is positioned immediately radially inwardly of the inner circumferential surface of the casing 23, providing fluid communication between two regions of the chamber 21 which are positioned on respective both sides of the movable valve 27. Accordingly, a fluid path 36 is created across the movable valve 27 through the fluid passage 34 along the inner circumferential surface of the casing 23. Continued rotation of the rotating member 25 in the direction indicated by the arrow B causes the viscous fluid 22 to flow in the direction indicated by the arrow C through the fluid path 36. Since the viscous fluid 22 thus flowing freely through the fluid path 36 imposes no torque damping forces on the rotation of the rotating member 25, the rotating member 25 rotates smoothly in the direction indicated by the arrow B, and hence the rotary damper 20 performs no damping action when the rotating member 25 rotates in the direction indicated by the arrow B.

Figure 6:
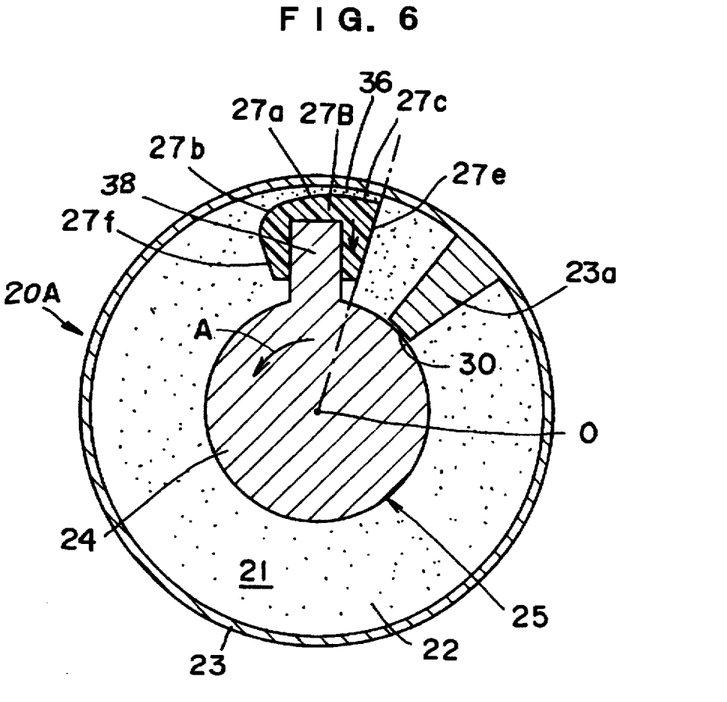
FIG. 6 is a cross-sectional view of a rotary damper according to another embodiment of the present invention.
Figure 7:
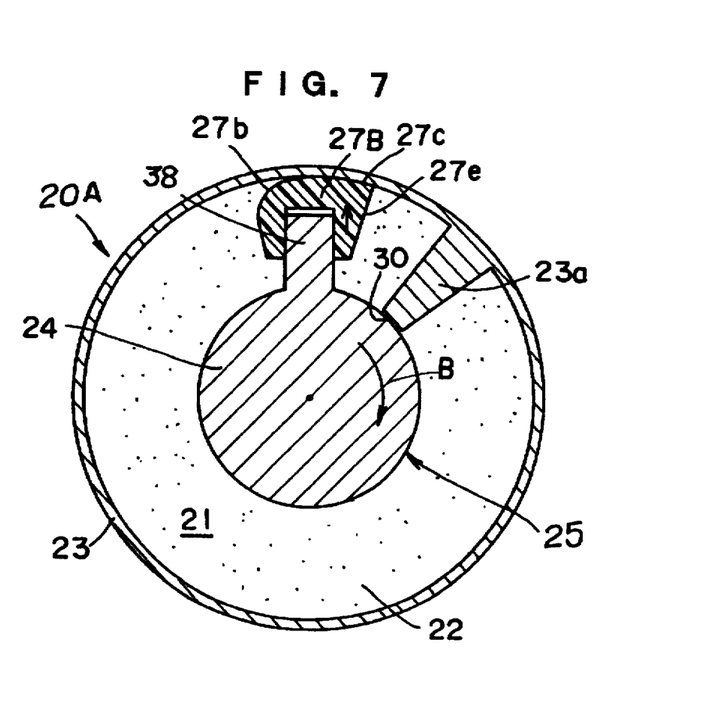
FIG. 7 is a cross-sectional view of the rotary damper shown in FIG. 6, illustrating the manner in which a movable valve thereof moves.

FIGS. 6 and 7 show a rotary damper 20A according to another embodiment of the present invention. The rotary damper 20A shown in FIGS. 6 and 7 comprises a casing 23 having a hollow cylindrical chamber 21 filled with a highly viscous fluid 22 and including a radially inward casing ridge 23a, a rotating member 25 coaxially disposed in the casing 23 for rotation therein and having a support projection 38 of substantially rectangular cross section which projects radially outwardly from a shaft 24 and extends axially longitudinally along the axis O of the shaft 24, and a movable valve 27B radially slidably mounted on the support projection 38. A clearance 30 is defined between the casing ridge 23a and the shaft 24.

The movable valve 27B has a first slanted flat surface 27e extending on one side thereof radially in alignment with the axis O of the shaft 24 obliquely with respect to the radial axis of the support projection 38 and a second slanted flat surface 27f extending on its opposite side and shorter than the first slanted flat surface 27e. The movable valve 27B also has a large-diameter outer curved surface 27a near the first slanted flat surface 27e and a small-diameter outer curved surface 27b near the second slanted flat surface 27f, the curved surfaces 27a, 27b facing radially outwardly. The large-diameter outer curved surface 27a includes a fluid blocking surface 27c near its end for contacting the inner circumferential surface of the casing 23.

The rotary damper 20A shown in FIGS. 6 and 7 operates as follows:

When the rotating member 25 rotates counterclockwise in the direction indicated by the arrow A in FIG. 6, the movable valve 27B rotates with the rotating member 25. At this time, the movable valve 27B is subjected to the resistance of the viscous fluid 22. Since the viscous fluid 22 flows into the gap between the inner circumferential surface of the casing 23 and the small-diameter outer curved surface 27b, the movable valve 27B is displaced radially inwardly along the support projection 38. Now, a fluid path 36 is created between the inner circumferential surface of the casing 23 and the movable valve 27B, and the viscous fluid 22 flows across the movable valve 27B through the fluid path 36 along the inner circumferential surface of the casing 23. Therefore, when the rotating member 25 rotates in the direction indicated by the arrow A in FIG. 6, the rotating member 25 smoothly rotates without being resisted by the viscous fluid 22, and the rotary damper 20A produces no damping action.

When the rotating member 25 rotates clockwise in the direction indicated by the arrow B in FIG. 7, the movable valve 27B rotates with the rotating member 25. At this time, the first slanted flat surface 27e of the movable valve 27B is subjected to the resistance of the viscous fluid 22. Because the first slanted flat surface 27e extends radially in alignment with the axis O of the shaft 24 obliquely with respect to the radial axis of the support projection 38, the movable valve 27B is subjected to forces tending to move radially outwardly due to a radially outward component of the pressure of the viscous fluid 22 that is applied to the first slanted flat surface 27e. Therefore, the movable valve 27B is displaced radially outwardly until the fluid blocking surface 27c thereof is brought into intimate contact with the inner circumferential surface of the casing 23 as shown in FIG. 7. Upon further rotation of the rotating member 25 in the direction indicated by the arrow B, the viscous fluid 22 is forced to flow through the clearance 30 between the casing ridge 23a and the rotating member 25. Inasmuch as the clearance 30 functions as an orifice to restrict the flow of the viscous fluid 22 therethrough, the viscous fluid 22 produces high torque damping forces against the rotation of the rotating member 25 in the casing 23. The movable valve 27B automatically moves radially outwardly closing the fluid path 36 and hence the rotary damper 20A generates its damping action immediately after the rotating member 25 has started to rotate. Consequently, when the rotating member 25 rotates in the direction indicated by the arrow B, the rotary damper 20 is free of any substantial operational range where no damping action is available, and hence functions as a non-hysteresis rotary damper. The rotation of the rotary member 25 stops when the movable valve 27B engages the casing ridge 23a.

Figure 8:
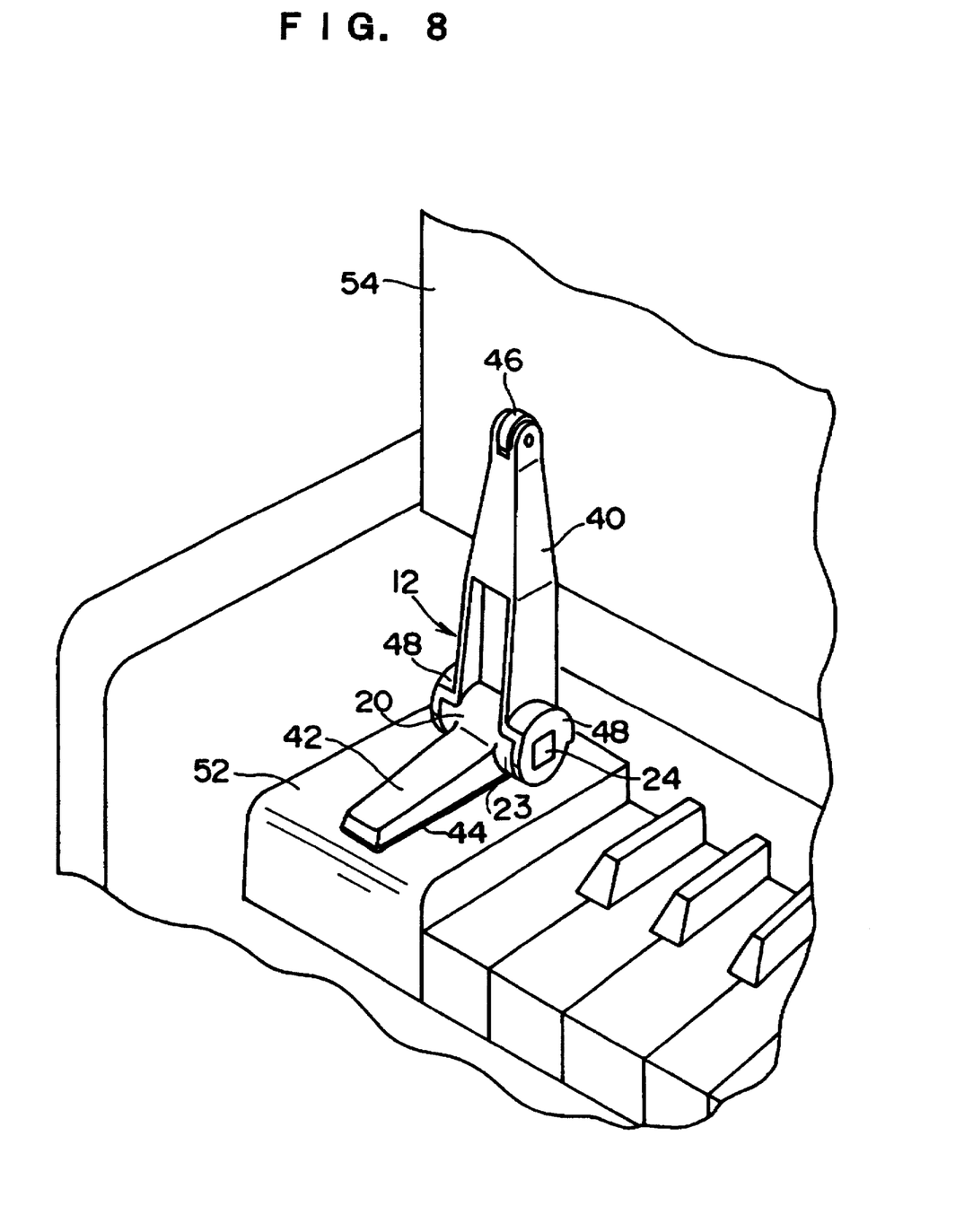
FIG. 8 is a fragmentary perspective view of a closure device which employs a rotary damper according to the present invention, the closure device being shown as combined with the fall beard of a piano.
Figure 9:
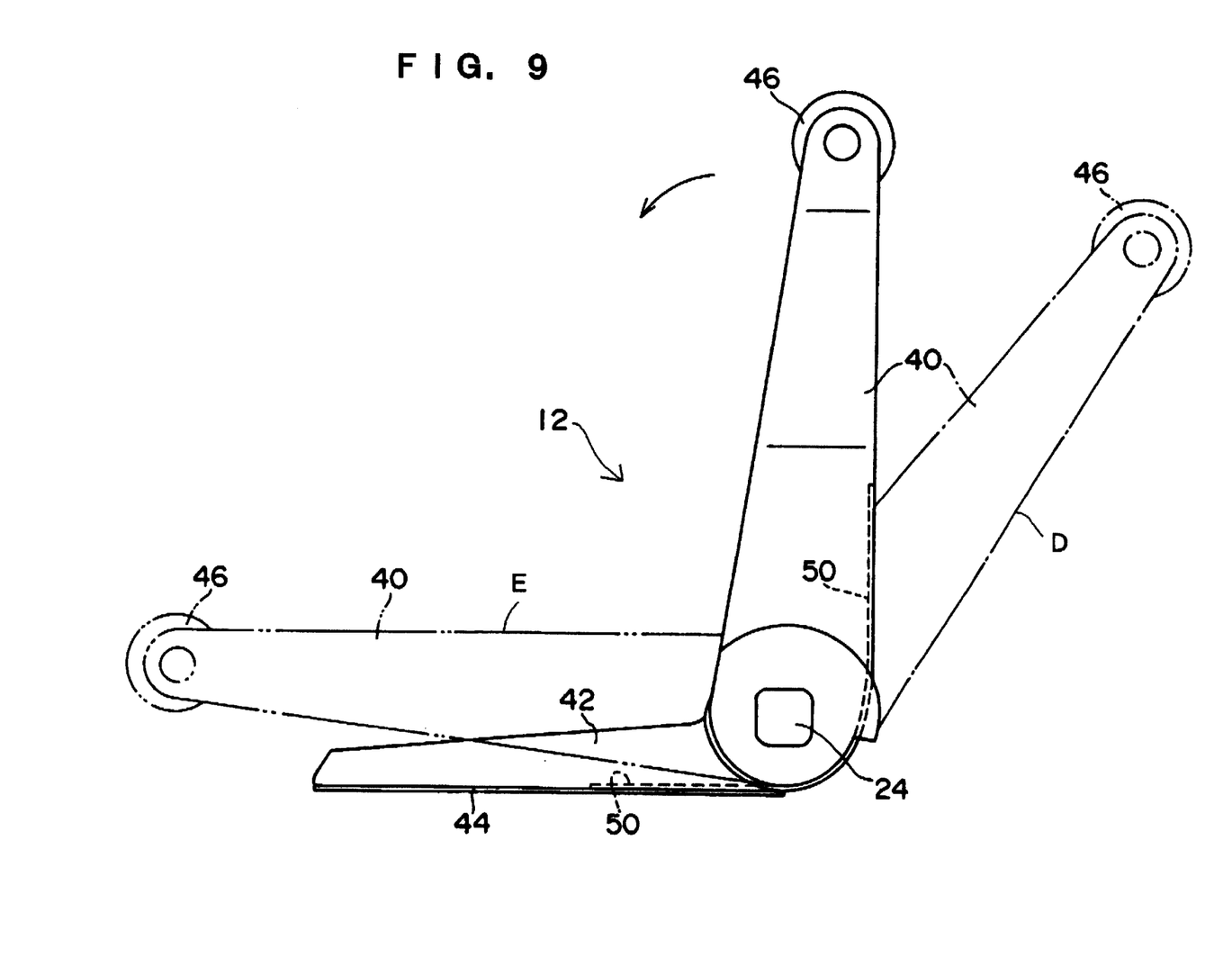
FIG. 9 is a side elevational view of the closure device shown in FIG. 8.

FIGS. 8 and 9 show a closure device 12 which employs the rotary damper 20 or 20A, the closure device 12 being shown as combined with the fall board 54 of a piano. The closure device 12 may of course be combined with any of other relatively heavy covers which need to be closed slowly.

As shown in FIG. 8, the closure device 12 comprises a rotary damper 20, which may be the rotary damper 20 shown in FIGS. 1 and 2 or the rotary damper 20A shown in FIGS. 6 and 7, an arm 40 connected at one end thereof to the shaft 24 of the rotary damper 20, and a support base 42 integrally joined to the casing 23 of the rotary damper 20, the support base 42 having a bottom surface lying flush with the bottom surface of the rotary damper 20. The support base 42 is fixedly mounted on a side plate 52 positioned between the keyboard and a cheek of the piano.

A double-sided adhesive tape 44 is applied at one side thereof to the bottom surface of the support base 42. Therefore, the closure device 12 can easily be fixed to the piano when the double-sided adhesive tape 44 applied to the support base 42 is applied at its opposite side to the side plate 52 of the piano. Alternatively, the support base 42 may be fastened to the side plate 52 by wood screws rather than the double-sided adhesive tape 44.

The arm 40 has a tower-like shape tapered off toward its distal end on which a freely rotatable roller 46 is mounted. The roller 46 is held in rolling contact with the inner surface of the fall board 54 of the piano. The other end of the arm 40 has a pair of spaced shaft supports 48 secured to the shaft 24 of the rotary damper 20. Therefore, the arm 40 is angularly movable with respect to the casing 23 of the rotary damper 20 and hence the support base 42.

As shown in FIG. 9, the arm 40 can be angularly moved an angle of 115°±5° between the dot-and-dash-line position D in which the arm 40 is angularly displaced away from the support base 42, thus opening the fall board 54, and the two-dot-and-dash-line position E in which the arm 40 is angularly displaced closely to the support base 42, thus closing the fall board 54. The angle through which the arm 40 is angularly movable can be determined depending on the effective angle through which the rotary damper 20 can produce torque damping forces.

A leaf spring 50 extends from the bottom surface of the support base 42 partly around the casing 23 to a rear surface of the arm 40, and has its opposite ends connected to the support base 42 and the arm 40, respectively. The leaf spring 50 normally urges the arm 40 to turn in a direction toward the dot-and-dash-line position D for thereby opening the fall board 54. Therefore, the fall board 54 which is relatively heavy can easily be opened under light forces with the aid of the returning forces of the leaf spring 50.

The opposite ends of the shaft 24 of the rotary damper 20 have a square shape and are fitted in the respective shaft supports 48 of the arm 40. Therefore, angular movement of the arm 40 causes the shaft 24 to rotate in the casing 23.

When the fall board 54 is closed, the arm 40 is angularly moved in a direction from the dot-and-dash-line position D toward the two-dot-and-dash-line position E. At this time, the shaft 24 is rotated in a direction to cause the viscous fluid 22 to produce high torque damping forces. Consequently, the rotation of the shaft 24 is slowed, thus dampening the closing movement of the fall board 54. Since the rotary damper 20 can generate torque damping forces immediately after the shaft 24 has started to rotate, there is no danger of pinching the user's fingers even when the user opens the fall board 54 to some extent and then releases the fall board 54.

Figure 10:
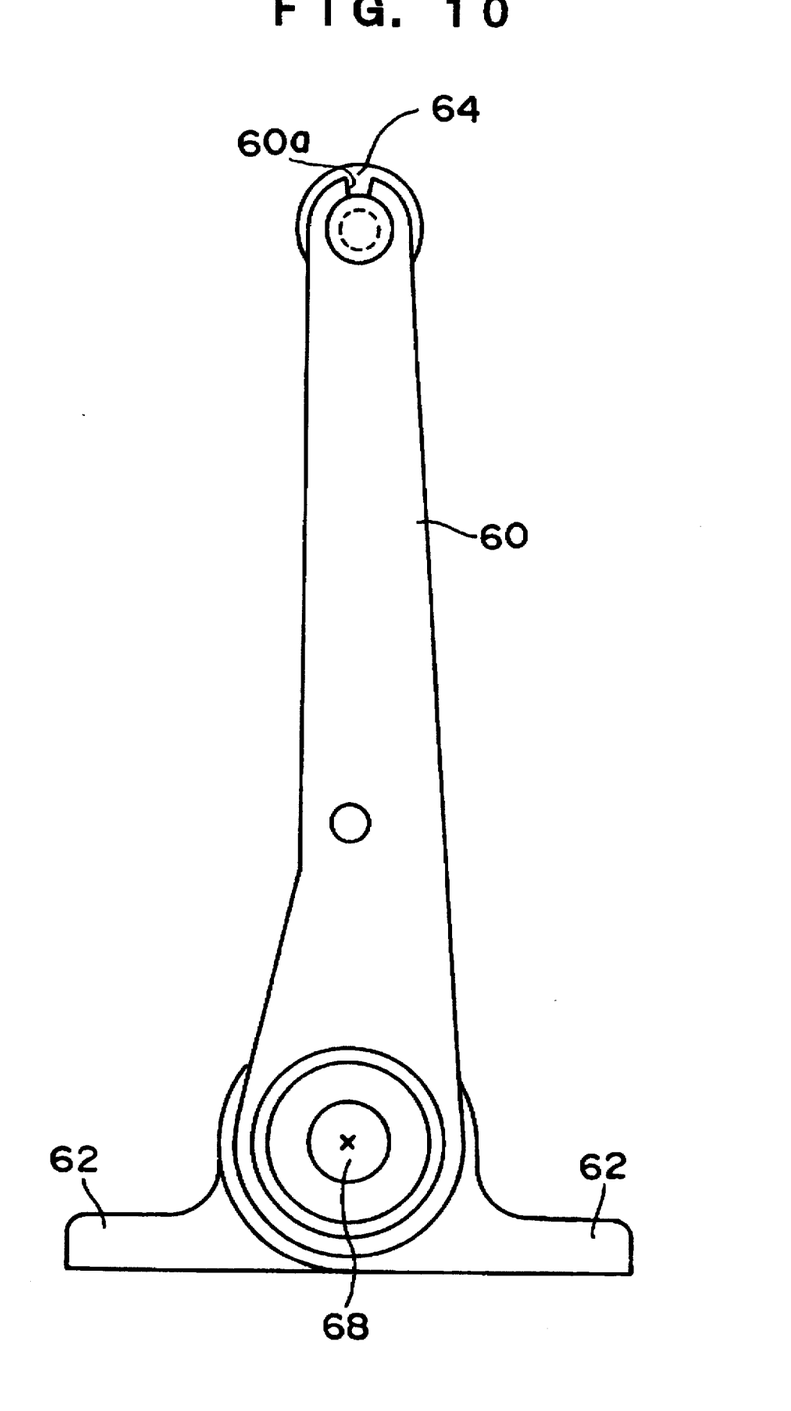
FIG. 10 is a front elevational view of a closure device according to another embodiment of the present invention.
Figure 11:
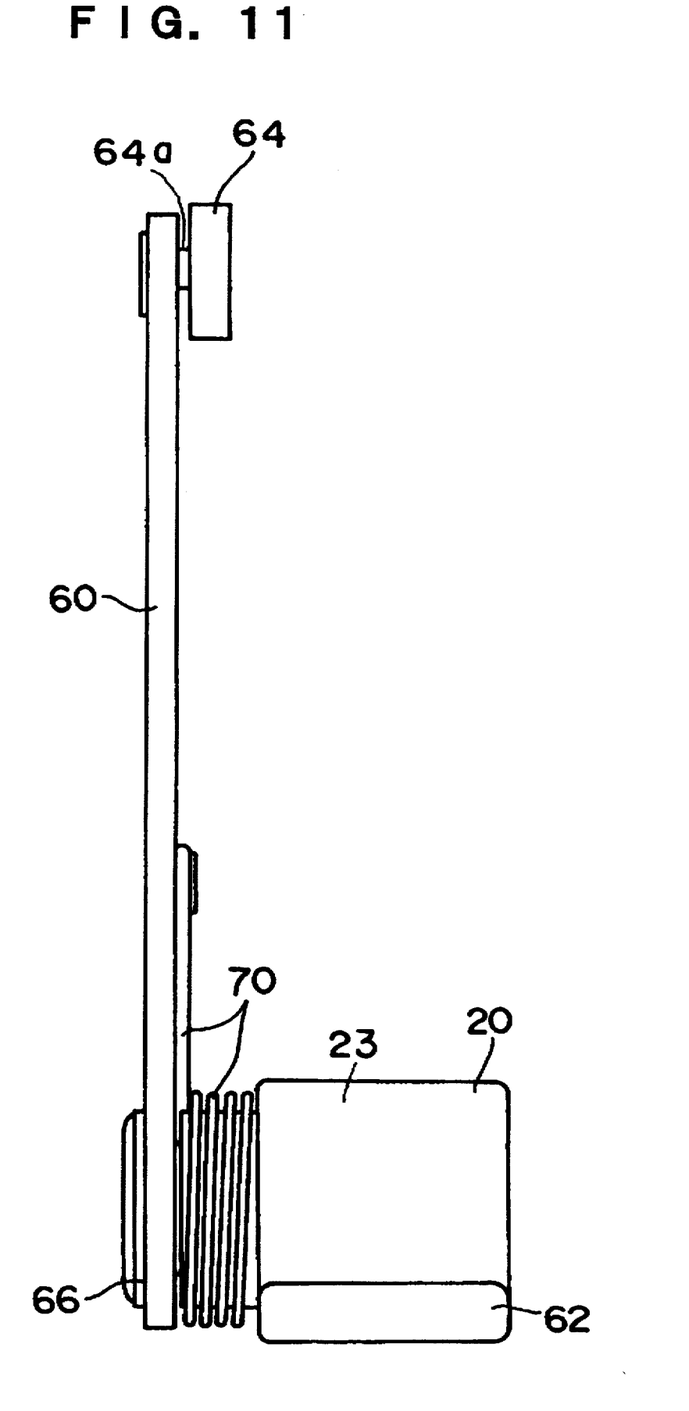
FIG. 11 is a side elevational view of the closure device shown in FIG. 10.

FIGS. 10 and 11 show a closure device according to another embodiment of the present invention, typically for use with the fall board of a piano. The closure device shown in FIGS. 10 and 11 has a plate-like arm 60 and a pair of support bases 62 extending in respective opposite directions. The arm 60 supports a roller 64 rotatably mounted on an end of the arm 60 remote from the support bases 62. The closure device also has a rotary damper 20, which may be the rotary damper 20 shown in FIGS. 1 and 2 or the rotary damper 20A shown in FIGS. 6 and 7. The rotary damper 20 includes a shaft having one end projecting as an extension 66 from a casing 23, and the arm 60 is connected at its opposite end to the shaft extension 66 by a setscrew 68, so that the arm 60 and the shaft extension 66 will rotate with each other.

The arm 60 is normally biased to return to a position for opening the fall board of the piano by a coil spring 70 acting between the arm 60 and the casing 23 and coiled around the extension 66.

The roller 64 has a shaft 64a fitted in a groove 60a defined in the distal end of the arm 60. Consequently, the roller 64 can easily be attached to the arm 60 simply when the shaft 64a is inserted in the groove 60a.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claim rather than by the foregoing description.

What is claimed is:

1. A rotary damper comprising:

a casing having a chamber defined therein filled with a viscous fluid;

a rotating member rotatably disposed in said casing, having a shaft and having a support projection projecting radially outwardly from an outer circumferential surface and extending parallel to an axis of said shaft; and     valve means movably supported on said rotating member for controlling a flow of the viscous fluid in said chamber, said valve means having a flat surface extending essentially radially in alignment with an axis of said shaft to create resistance to flow of the viscous fluid and being movably engaged on an outer surface of said support projection to define a fluid path for the viscous fluid between the valve means and an inner circumferential surface of said casing;

wherein said valve means is movable on said support projection to selectively open and close said fluid path depending on a direction in which said rotating member rotates in said chamber.

2. A rotary damper according to claim 1, wherein said support projection has a substantially circular cross-sectional shape, said valve means comprising a valve angularly movably supported on said support projection.

3. A rotary damper according to claim 1, wherein said valve means comprises a valve having a large-diameter outer curved surface, a small-diameter outer curved surface, and at least one fluid passage defined in said large-diameter outer curved surface and said small-diameter outer curved surface.

4. A rotary damper according to claim 3, wherein said large-diameter outer curved surface has a fluid blocking surface near an end thereof for movement into and out of contact with the inner circumferential surface of said casing to selectively open and close said fluid path depending on the direction in which said rotating member rotates in said chamber.

5. A rotary damper according to claim 1, wherein said casing has a casing ridge projecting radially inwardly for limiting rotation of said rotary member, with a clearance being defined between said casing ridge and said shaft to allow said shaft to rotate in said casing.

6. A rotary damper according to claim 1, wherein said casing has a pair of diametrically opposite casing ridges projecting radially inwardly for limiting rotation of said rotary member, said rotating member having a pair of diametrically opposite support projections projecting radially outwardly from the outer circumferential surface of said shaft and extending parallel to the axis of said shaft, said valve means comprising a pair of diametrically opposite valves movably supported on said support projections, respectively, each of said valves being positioned between said casing ridges.

7. A rotary damper according to claim 1, wherein said support projection has a substantially rectangular cross-sectional shape, said valve means comprising a valve radially movably supported on said support projection.

8. A closure device for selectively opening and closing a cover, comprising:
an arm having a roller rotatably mounted on an end thereof and held in rolling contact with the cover;
a rotary damper having a shaft coupled to said arm for being angularly moved by said arm,
said rotary damper including
a casing having a chamber defined therein filled with a viscous fluid;
a rotating member rotatably disposed in said casing, having a shaft and having a support projection projecting radially outwardly from an outer circumferential surface and extending parallel to an axis of said shaft; and
valve means movably supported on said rotating member for controlling a flow of the viscous fluid in said chamber, said valve means having a flat surface extending essentially radially in alignment with an axis of said shaft and being movably engaged on an outer surface of said support projection to define a fluid path for the viscous fluid between the valve means and an inner circumferential surface of said casing;
wherein said valve means is movable on said support projection to selectively open and close said fluid path depending on a direction in which said rotating member rotates in said chamber; and
a support base integral with said rotary damper and extending in at least one direction from said rotary damper, said support base being adapted to be fixed to a member with respect to which the cover is to be closed.

9. A closure device according to claim 8, further comprising a double-sided adhesive tape having one side applied to a bottom surface of said support base and an opposite side applied to said member with respect to which the cover is to be closed.

10. A closure device according to claim 8, further comprising spring means acting between said arm and said rotary damper for normally urging said arm in a direction to open the cover.

11. A closure device according to claim 10, wherein said spring means comprising a leaf spring having opposite ends connected to said arm and said support base, respectively.

12. A closure device according to claim 10, wherein said spring means comprising a coil spring having opposite ends connected to said arm and said rotary damper, respectively.

13. A rotary damper comprising:
a casing having a chamber defined therein filled with a viscous fluid;
a rotating member rotatably disposed in said chamber, said rotating member having a support projection and an axis of rotation; and
a valve movably having a flat surface extending essentially radially in alignment with the axis of rotation, said valve being engaged on an outer surface of said support projection for radial movement into and out of contact with an inner circumferential surface of said casing to selectively open and close a fluid path defined between said valve and an inner circumferential surface of said casing depending on a direction in which said rotating member rotates in said chamber.

14. A rotary damper according to claim 13, wherein said rotating member has a radially outwardly projecting support projection having a substantially circular cross-sectional shape, said valve being angularly movably supported on said support projection.

15. A rotary damper according to claim 13, wherein said rotating member has a radially outwardly projecting support projection having a substantially rectangular cross-sectional shape, said valve being radially movably supported on said support projection.

16. A rotary damper according to claim 13, wherein said valve has a large-diameter outer curved surface, a small-diameter outer curved surface, and at least one fluid passage defined in said large-diameter outer curved surface and said small-diameter outer curved surface.

17. A rotary damper according to claim 16, wherein said large-diameter outer curved surface has a fluid blocking surface near an end thereof for movement into and out of contact with the inner circumferential surface of said casing to selectively open and close said fluid path depending on the direction in which said rotating member rotates in said chamber.

18. A rotary damper according to claim 13, wherein said rotating member has a shaft rotatably disposed in said chamber, said casing having a casing ridge projecting radially inwardly for limiting rotation of said rotary member, with a clearance being defined between said casing ridge and said shaft to allow said shaft to rotate in said chamber.

19. A rotary damper comprising:
a casing having a chamber defined therein filled with a viscous fluid;
a rotating member rotatably disposed in said casing, having a shaft and a support projection projecting radially outwardly from an outer circumferential surface of said shaft and extending parallel to an axis of said shaft; and
valve means movably supported on said rotating member for controlling a flow of the viscous fluid in said chamber, said valve means being movably supported on said support projection to define a fluid path for the viscous fluid between the valve and an inner circumferential surface of said casing and to selectively open and close said fluid path depending on a direction in which said rotating member rotates in said chamber, said valve means comprising a valve having a large-diameter outer curved surface, a small-diameter outer curved surface, and at least one fluid passage defined in said large-diameter outer curved surface and said small-diameter outer curved surface.

20. A rotary damper according to claim 19, wherein said large-diameter outer curved surface has a fluid blocking surface near an end thereof for movement into and out of contact with the inner circumferential surface of said casing to selectively open and close said fluid path depending on the direction in which said rotating member rotates in said chamber.

21. A rotary damper comprising:

a casing having a chamber defined therein filled with a viscous fluid;

a rotating member rotatably disposed in said casing, having a shaft and a support projection projecting radially outwardly from an outer circumferential surface of said shaft and extending parallel to an axis of said shaft, said support projection having a substantially rectangular cross-sectional shape; and valve means radially movably supported on said support projection for controlling a flow of the viscous fluid in said chamber, said valve means being movably supported on said support projection to define a fluid path for the viscous fluid between the valve and an inner circumferential surface of said casing and to selectively open and close said fluid path depending on a direction in which said rotating member rotates in said chamber.

22. A rotary damper comprising:

a casing having a chamber defined therein filled with a viscous fluid;

a rotating member rotatably disposed in said chamber having a radially outwardly projecting support projection with a substantially rectangular cross-sectional shape; and a valve radially movably supported on said support projection for radial movement into and out of contact with an inner circumferential surface of said casing to selectively open and close a fluid path defined between said valve and an inner circumferential surface of said casing depending on the direction in which said rotating member rotates in said chamber.

23. A rotary damper comprising:

a casing having a chamber defined therein filled with a viscous fluid;

a rotating member rotatably disposed in said chamber; and a valve movably supported on said rotating member for radial movement into and out of contact with an inner circumferential surface of said casing to selectively open and close a fluid path defined between said valve and an inner circumferential surface of said casing depending on the direction in which said rotating member rotates in said chamber, said having a large-diameter outer curved surface, a small-diameter outer curved surface, and at least one fluid passage defined in said large-diameter outer curved surface and said small-diameter outer curved surface.

24. A rotary damper according to claim 23, wherein said large-diameter outer curved surface has a fluid blocking surface near an end thereof for movement into and out of contact with the inner circumferential surface of said casing to selectively open and close said fluid path depending on the direction in which said rotating member rotates in said chamber.

* * * * *

UNITED STATES PATENT AND TRADEMARK OFFICE
CERTIFICATE OF CORRECTION

PATENT NO. : 5,697,122

DATED : DECEMBER 16, 1997

INVENTOR(S) : OKABE ET AL.

It is certified that error appears in the above-identified patent and that said Letters Patent is hereby corrected as shown below:

Column 3, line 51, "beard" should read —board—.

Column 4, line 14, delete "tatably" after the word "rotatably".

Column 4, line 41, "dieter" should read —diameter—.

Column 7, line 47, "arm40" should read —arm 40—.

Column 8, line 40, "claim" should read —claims—.

Column 12, line 25, insert —valve— after the word "said".

Signed and Sealed this

Ninth Day of February, 1999

Attest:

Attesting Officer

*Acting Commissioner of Patents and Trademarks*